US012771172B2

(12) United States Patent
Sippola

(10) Patent No.: US 12,771,172 B2
(45) Date of Patent: Oct. 20, 2026

(54) UNIVERSAL CHARGER

(71) Applicant: Oura Health Oy, Oulu (FI)

(72) Inventor: Kent Krister Sippola, Oulu (FI)

(73) Assignee: Oura Health Oy, Oulu (FI)

( * ) Notice: Subject to any disclaimer, the term of this patent is extended or adjusted under 35 U.S.C. 154(b) by 579 days.

(21) Appl. No.: 18/478,085

(22) Filed: Sep. 29, 2023

(65) Prior Publication Data

US 2025/0112496 A1 Apr. 3, 2025

(51) Int. Cl.
*H02J 50/00* (2016.01)
*H02J 7/70* (2026.01)
*H02J 50/10* (2016.01)

(52) U.S. Cl.
CPC ............ *H02J 50/005* (2020.01); *H02J 7/731* (2026.01); *H02J 50/10* (2016.02)

(58) Field of Classification Search
CPC ........... H02J 50/005; H02J 50/10; H02J 7/731
USPC ........................................................... 320/114
See application file for complete search history.

(56) References Cited

U.S. PATENT DOCUMENTS

2020/0321803 A1* 10/2020 Saunamaki ........... G06F 1/1632
2023/0134920 A1* 5/2023 Su ........................ H01Q 1/2291 320/107
2024/0022886 A1* 1/2024 Qiu .......................... H04W 4/80
2024/0291319 A1* 8/2024 Samardzija ............. H02J 50/10
2025/0112498 A1* 4/2025 Saikkonen ............ H02J 50/005

* cited by examiner

*Primary Examiner* — Daniel A Hess
(74) *Attorney, Agent, or Firm* — ArentFox Schiff LLP

(57) ABSTRACT

Methods, systems, and devices for a charging device are described. The charging device includes a base, a charging post extending from the base, an inductive charging component disposed with the charging post, and a support apparatus configured to secure a wearable ring device associated with a ring size of multiple ring sizes against the charging post for charging. The charging post may be configured to receive rings associated with multiple ring sizes, wherein the charging post has a diameter that corresponds to an inner diameter of a smallest ring size of the multiple ring sizes. The inductive charging component may be configured to wirelessly charge the wearable ring device through a surface of the charging post via inductive coupling when an inner circumferential surface of the wearable ring device is within a threshold distance of the surface of the charging post.

18 Claims, 7 Drawing Sheets

UNIVERSAL CHARGER

FIELD OF TECHNOLOGY

The following relates to wearable devices and data processing, including a universal charger for wearable ring devices.

BACKGROUND

Some wearable devices may be configured to collect data from users associated with biological data, such as temperature data, heart rate data, and the like. The wearable devices may be configured to charge on a charger base. However, poor connection with a charger base may prevent the wearable device from charging as expected.

DETAILED DESCRIPTION

Figure 1:
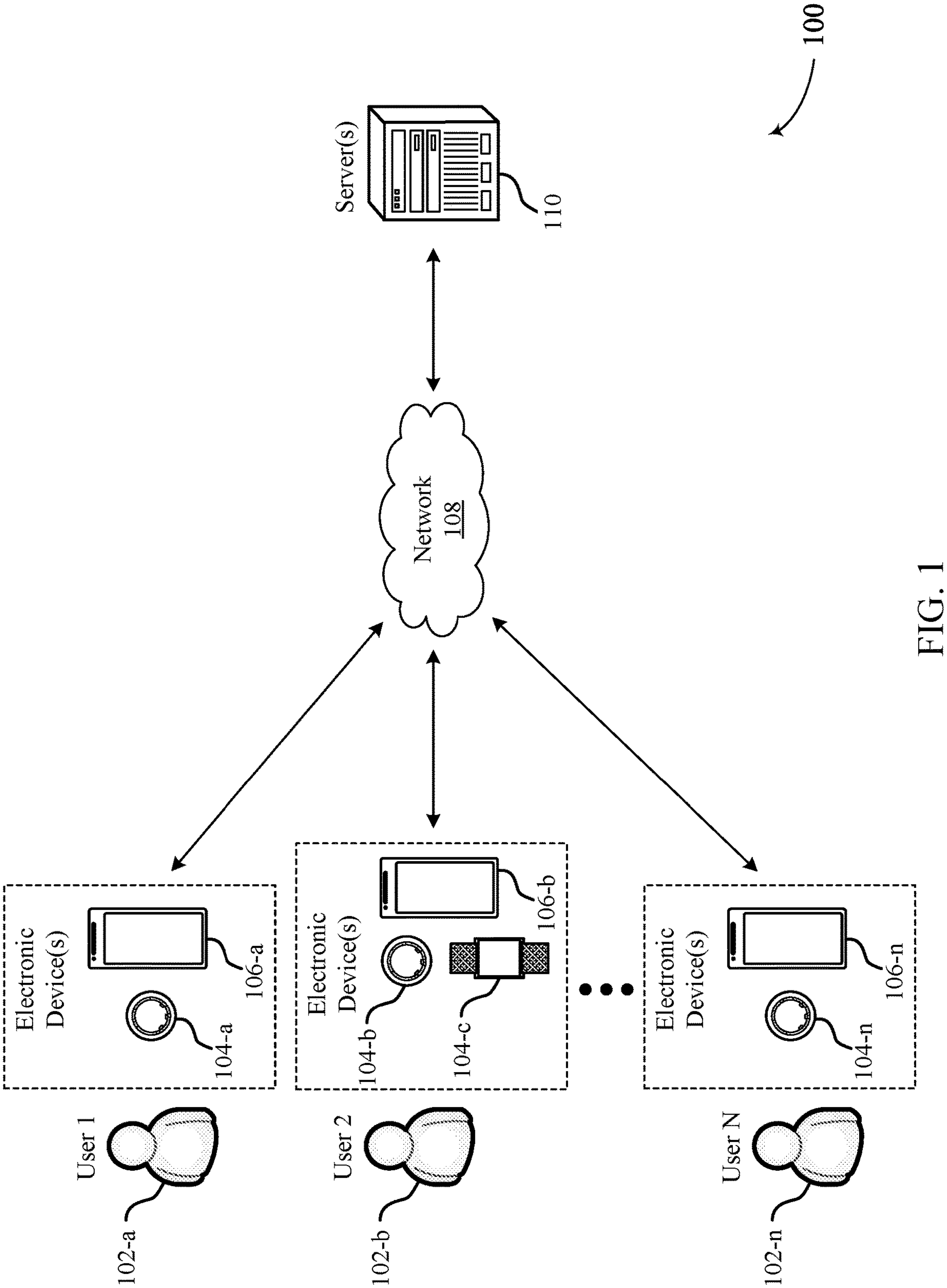
FIG. 1 illustrates an example of a system that supports a universal charger in accordance with aspects of the present disclosure.

Wearable devices may be configured to collect physiological data from users, such as light-based photoplethysmogram (PPG) data. However, the level or quality of skin contact between the wearable device and the user's tissue may affect the quality of PPG measurements. As such, wearable devices may be manufactured in varying sizes (e.g., circumferential sizes) in order to achieve good skin contact and a comfortable fit for different users, and to cover respective variations in user fit. For example, wearable ring devices may be manufactured in multiple discrete sizes to accommodate a wide range of user finger sizes. In some cases, a wearable device may be associated with a charger base manufactured for the size of the respective wearable device, such that the size of the charger base (e.g., a support of the charger base) may be specific to the size of the user's wearable device. However, manufacturing multiple chargers (e.g., one for each size ring, or one charger for a range of sizes) may be expensive and may result in other technical challenges (e.g., wider range of manufacturing tolerances across multiple charger sizes). Moreover, if a wearable ring device is placed on a charger base that is not appropriately sized for the ring, the ring may exhibit poor contact with a charging component of the charger base (e.g., an inductive charging component, or a contact-based charging component). These issues may result in the wearable device failing to charge, or charging at a relatively slow speed, and may also incur unnecessary cost related to manufacturing the charging devices.

Techniques, methods, and apparatuses described herein provide for a universal charger (e.g., charging device, charger, universal charging device, etc.) that is able to accommodate and charge wearable ring devices of varying sizes. The charging device may include a configuration of three contact points to secure wearable ring devices of varying size to the charger base. Specifically, the charger device includes a charging post set in a ring-shaped well that is able to receive multiple different sized wearable ring devices. Two support structures may contact the outer circumferential surface of a wearable ring device at different radial positions to force the wearable ring device against the charging post for charging. The distance between the support structures and the charging post may correspond to a width of the varying sized wearable ring devices, such that the ring fits securely onto the charger between the charging post and the support structures, and is held firmly in place for charging.

In order to accommodate different sized wearable ring devices, the angle or curvature of the support structures may be offset relative to the angle (e.g., curvature) of the charging post. By offsetting the angle of the support structures relative to the angle/curvature of the charging post, larger wearable ring devices may contact the support structures toward the outer edges of the support structures, where smaller wearable ring devices may contact the support structures toward the inner edges of the support structures. Further, the support structures may be configured to contact the wearable ring device placed on an upper hemisphere of the wearable ring device (e.g., higher than half way up on the ring) when the wearable ring device is placed on the charger. By contacting the wearable ring device on the upper hemisphere, the charger device described herein may be able to securely retain the wearable ring device against the charger when the entire charger base is moved or otherwise disturbed.

Aspects of the disclosure are initially described in the context of systems supporting physiological data collection from users via wearable devices. Aspects of the disclosure are additionally illustrated with respect to charging diagrams. Aspects of the disclosure are further illustrated by and described with reference to apparatus diagrams, system diagrams, and flowcharts that relate to universal chargers.

FIG. 1 illustrates an example of a system 100 that supports universal charger in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices (e.g., IoT devices), smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, blood oxygen saturation (SpO2), blood sugar levels (e.g., glucose metrics), and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-*a* (User 1) may operate, or may be associated with, a wearable device 104-*a* (e.g., ring 104-*a*) and a user device 106-*a* that may operate as described herein. In this example, the user device 106-*a* associated with user 102-*a* may process/store physiological parameters measured by the ring 104-*a*. Comparatively, a second user 102-*b* (User 2) may be associated with a ring 104-*b*, a watch wearable device 104-*c* (e.g., watch 104-*c*), and a user device 106-*b*, where the user device 106-*b* associated with user 102-*b* may process/store physiological parameters measured by the ring 104-*b* and/or the watch 104-*c*. Moreover, an nth user 102-*n* (User N) may be associated with an arrangement of electronic devices described herein (e.g., ring 104-*n*, user device 106-*n*). In some aspects, wearable devices 104 (e.g., rings 104, watches 104) and other electronic devices may be communicatively coupled to the user devices 106 of the respective users 102 via Bluetooth, Wi-Fi, and other wireless protocols.

In some implementations, the rings 104 (e.g., wearable devices 104) of the system 100 may be configured to collect physiological data from the respective users 102 based on arterial blood flow within the user's finger. In particular, a ring 104 may utilize one or more light-emitting components, such as LEDs (e.g., red LEDs, green LEDs) that emit light on the palm-side of a user's finger to collect physiological data based on arterial blood flow within the user's finger. In general, the terms light-emitting components, light-emitting elements, and like terms, may include, but are not limited to, LEDs, micro LEDs, mini LEDs, laser diodes (LDs) (e.g., vertical cavity surface-emitting lasers (VCSELs), and the like.

In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-*a* associated with the first user 102-*a* may be communicatively coupled to the user device 106-*a*, where the user device 106-*a* is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time that the user 102 is asleep into one or more sleep stages (e.g., sleep stage classification). For example, as shown in FIG. 1, User 102-*a* may be associated with a wearable device 104-*a* (e.g., ring 104-*a*) and a user device 106-*a*. In this example, the ring 104-*a* may collect physiological data associated with the user 102-*a*, including temperature, heart rate, HRV, respiratory rate, and the like. In some aspects, data collected by the ring 104-*a* may be input to a machine learning classifier, where the machine learning classifier is configured to determine periods of time that the user 102-*a* is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-*a* via a GUI of the user device 106-*a*. Sleep stage classification may be used to provide feedback to a user 102-*a* regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-*a* via the wearable device 104-*a*. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state: 2) circadian rhythms: 3) non-endogenous daily rhythms shown to be imposed on top of circadian rhythms, as in work schedules; 4) weekly rhythms, or other artificial time periodicities exogenously imposed (e.g. in a hypothetical culture with 12 day "weeks," 12 day rhythms could be used): 5) multi-day ovarian rhythms in women and spermatogenesis rhythms in men: 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

In some aspects, the respective devices of the system 100 may support techniques for a universal charger that is able to accommodate and charge wearable ring devices 104 of varying sizes. The charging device may include a configuration of three contact points to secure wearable ring devices 104 of varying size to the charger base. Specifically, the charger device includes a charging post set in a ring-shaped well that is able to receive multiple different sized wearable ring devices. Two support structures may contact the outer circumferential surface of a wearable ring device 104 at different radial positions to force the wearable ring device 104 against the charging post for charging. The distance between the support structures and the charging post may correspond to a width of the varying sized wearable ring devices 104, such that the ring 104 fits securely onto the charger between the charging post and the support structures, and is held firmly.

In order to accommodate different sized wearable ring devices 104, the angle or curvature of the support structures may be offset relative to the angle (e.g., curvature) of the charging post. By offsetting the angle of the support structures relative to the charging post, larger wearable ring devices 104 may contact the support structures toward the outer edges of the support structures, where smaller wearable ring devices 104 may contact the support structures toward the inner edges of the support structures. Further, the support structures may be configured to contact the wearable ring device 104 placed on an upper hemisphere of the wearable ring device 104 (e.g., higher than halfway up on the ring) when the wearable ring device 104 is placed on the charger. By contacting the wearable ring device 104 on the upper hemisphere, the charger device described herein may be able to securely retain the wearable ring device 104 against the charger when the entire charger base is moved or otherwise disturbed. The universal charger is further described herein with reference to FIGS. 2-7.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
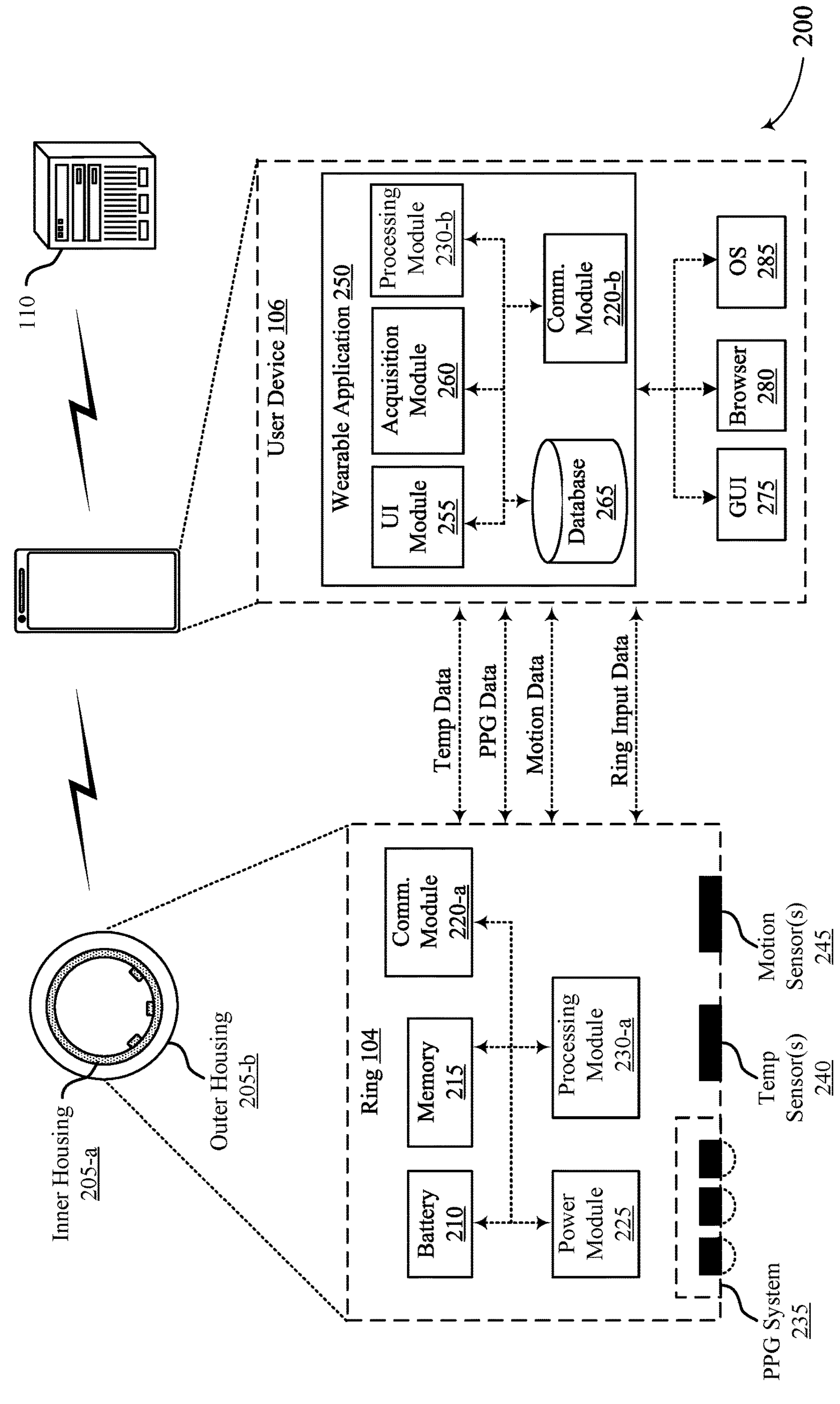
FIG. 2 illustrates an example of a system that support a universal charger in accordance with aspects of the present disclosure.

FIG. 2 illustrates an example of a system 200 that supports universal charger in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels (SpO2), blood sugar levels (e.g., glucose metrics), and the like.

The system 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, PPG data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-*a* and an outer housing 205-*b*. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-*a*, a memory 215, a communication module 220-*a*, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using adhesives, wraps, clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-*b* component (e.g., a shell) and an inner housing 205-*a* component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-*b* (e.g., a metal outer housing 205-*b*). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate (s) from water and/or other chemicals.

The outer housing 205-*b* may be fabricated from one or more materials. In some implementations, the outer housing 205-*b* may include a metal, such as titanium, that may provide strength and abrasion resistance at a relatively light weight. The outer housing 205-*b* may also be fabricated from other materials, such polymers. In some implementations, the outer housing 205-*b* may be protective as well as decorative.

The inner housing 205-*a* may be configured to interface with the user's finger. The inner housing 205-*a* may be formed from a polymer (e.g., a medical grade polymer) or other material. In some implementations, the inner housing 205-*a* may be transparent. For example, the inner housing 205-*a* may be transparent to light emitted by the PPG light emitting diodes (LEDs). In some implementations, the inner housing 205-*a* component may be molded onto the outer housing 205-*b*. For example, the inner housing 205-*a* may include a polymer that is molded (e.g., injection molded) to fit into an outer housing 205-*b* metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-*a* of the ring 104 may include one or more processors (e.g., processing units), microcontrollers, digital signal processors, systems on a chip (SOCs), and/or other processing devices. The processing module 230-*a* communicates with the modules included in the ring 104. For example, the processing module 230-*a* may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-*a* may communicate with the memory 215. The memory 215 may include computer-readable instructions that, when executed by the processing module 230-*a*, cause the processing module 230-*a* to perform the various functions attributed to the processing module 230-*a* herein. In some implementations, the processing module 230-*a* (e.g., a microcontroller) may include additional features associated with other modules, such as communication functionality provided by the communication module 220-*a* (e.g., an integrated Bluetooth Low Energy transceiver) and/or additional onboard memory 215.

The communication module 220-*a* may include circuits that provide wireless and/or wired communication with the user device 106 (e.g., communication module 220-*b* of the user device 106). In some implementations, the communication modules 220-*a*, 220-*b* may include wireless communication circuits, such as Bluetooth circuits and/or Wi-Fi circuits. In some implementations, the communication modules 220-*a*. 220-*b* can include wired communication circuits, such as Universal Serial Bus (USB) communication circuits. Using the communication module 220-*a*, the ring 104 and the user device 106 may be configured to communicate with each other. The processing module 230-*a* of the ring may be configured to transmit/receive data to/from the user device 106 via the communication module 220-*a*. Example data may include, but is not limited to, motion data, temperature data, pulse waveforms, heart rate data, HRV data, PPG data, and status updates (e.g., charging status, battery charge level, and/or ring 104 configuration settings). The processing module 230-*a* of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during charging. The power module 225 may also regulate voltage (s) of the device electronics, regulate power output to the device electronics, and monitor the state of charge of the battery 210. In some implementations, the battery 210 may include a protection circuit module (PCM) that protects the battery 210 from high current discharge, over voltage during charging, and under voltage during discharge. The power module 225 may also include electro-static discharge (ESD) protection.

The one or more temperature sensors 240 may be electrically coupled to the processing module 230-*a*. The temperature sensor 240 may be configured to generate a temperature signal (e.g., temperature data) that indicates a temperature read or sensed by the temperature sensor 240. The processing module 230-*a* may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-*a*) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-*a* may use to determine the temperature. As another example, in cases where the temperature sensor 240 includes a passive sensor, the processing module 230-*a* (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-*a* may sample the user's temperature over time. For example, the processing module 230-*a* may sample the user's temperature according to a sampling rate. An example sampling rate may include one sample per second, although the processing module 230-*a* may be configured to sample the temperature signal at other sampling rates that are higher or lower than one sample per second. In some implementations, the processing module 230-*a* may sample the user's temperature continuously throughout the day and night. Sampling at a sufficient rate (e.g., one sample per second) throughout the day may provide sufficient temperature data for analysis described herein.

The processing module 230-*a* may store the sampled temperature data in memory 215. In some implementations, the processing module 230-*a* may process the sampled temperature data. For example, the processing module 230-*a* may determine average temperature values over a period of time. In one example, the processing module 230-*a* may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, which may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-*a* near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-*a* may acquire and process data from multiple temperature sensors 240 in a similar manner described with respect to a single temperature sensor 240. For example, the processing module 230 may individually sample, average, and store temperature data from each of the multiple temperature sensors 240. In other examples, the processing module 230-*a* may sample the sensors at different rates and average/store different values for the different sensors. In some implementations, the processing module 230-*a* may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/ external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-*a* may sample the PPG signal and determine a user's pulse waveform based on the PPG signal. The processing module 230-*a* may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 where the optical receiver(s) receive transmitted light that is reflected through the region of the user's finger. In some implementations, the PPG system 235 may be configured as a transmissive PPG system 235 where the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-*a* may control one or both of the optical transmitters to transmit light while sampling the PPG signal generated by the optical receiver. In some implementations, the processing module 230-*a* may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-*a* may store the pulse waveform in memory 215 in some implementations. The processing module 230-*a* may process the pulse waveform as it is generated and/or from memory 215 to determine user physiological parameters described herein.

The processing module 230-*a* may determine the user's heart rate based on the pulse waveform. For example, the processing module 230-*a* may determine heart rate (e.g., in beats per minute) based on the time between peaks in the pulse waveform. The time between peaks may be referred to as an interbeat interval (IBI). The processing module 230-*a* may store the determined heart rate values and IBI values in memory 215.

The processing module 230-*a* may determine HRV over time. For example, the processing module 230-*a* may determine HRV based on the variation in the IBIs. The processing module 230-*a* may store the HRV values over time in the memory 215. Moreover, the processing module 230-*a* may determine the user's respiratory rate over time. For example, the processing module 230-*a* may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-*a* may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BM1160 inertial micro electro-mechanical system (MEMS) sensor that may measure angular rates and accelerations in three perpendicular axes.

The processing module 230-*a* may sample the motion signals at a sampling rate (e.g., 50 Hz) and determine the motion of the ring 104 based on the sampled motion signals. For example, the processing module 230-*a* may sample acceleration signals to determine acceleration of the ring 104. As another example, the processing module 230-*a* may sample a gyro signal to determine angular motion. In some implementations, the processing module 230-*a* may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-*a* may compress the data stored in memory 215. For example, the processing module 230-*a* may delete sampled data after making calculations based on the sampled data. As another example, the processing module 230-*a* may average data over longer periods of time in order to reduce the number of stored values. In a specific example, if average temperatures for a user over one minute are stored in memory 215, the processing module 230-*a* may calculate average temperatures over a five minute time period for storage, and then subsequently erase the one minute average temperature data. The processing module 230-*a* may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-*b*, a communication module 220-*b*, and a storage module (e.g., database 265) configured to store application data.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency." contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some aspects, the system 200 may support techniques for a universal charger that is able to accommodate and charge wearable ring devices 104 of varying sizes. The charging device may include a configuration of three contact points to secure wearable ring devices 104 of varying size to the charger base. Specifically, the charger device includes a charging post set in a ring-shaped well that is able to receive multiple different sized wearable ring devices. Two support structures may contact the outer circumferential surface of a wearable ring device 104 at different radial positions to force the wearable ring device 104 against the charging post for charging. The distance between the support structures and the charging post may correspond to a width of the varying sized wearable ring devices 104, such that the ring 104 fits securely onto the charger between the charging post and the support structures, and is held firmly. In order to accommodate different sized wearable ring devices 104, the angle or curvature of the support structures may be offset relative to the angle (e.g., curvature) of the charging post. By offsetting the angle of the support structures, larger wearable ring devices 104 may contact the support structures toward the outer edges of the support structures, where smaller wearable ring devices 104 may contact the support structures toward the inner edges of the support structures. The universal charger is further described herein with reference to FIGS. 3-7.

Figure 3:
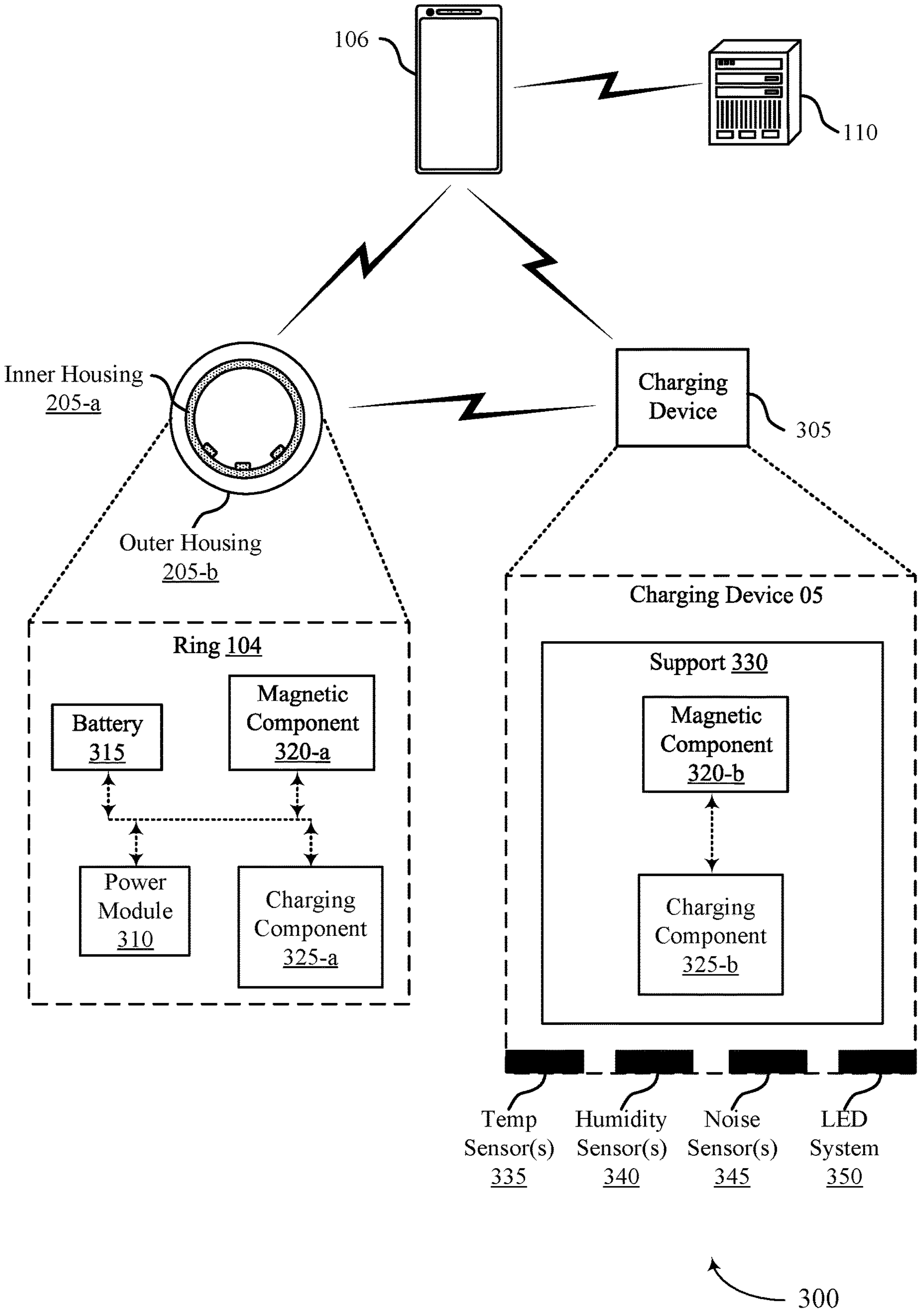
FIG. 3 illustrates an example of a system that supports a universal charger in accordance with aspects of the present disclosure.

FIG. 3 shows an example of a system 300 that supports a universal charger in accordance with aspects of the present disclosure. The system 300 may implement, or be implemented by, system 100, system 200, or both. In particular, system 300 illustrates an example of a ring 104 (e.g., wearable device 104) and a charging device 305, as described with reference to FIGS. 1 and 2.

In some aspects, the ring 104 may be configured to be worn around a user's finger and may measure one or more physiological parameters of the user when worn around the user's finger. Example measurements and determinations may include, but are not limited to, user skin temperature, PPG data, pulse waveforms, respiratory rate, heart rate, HRV, blood oxygen levels, and the like.

The system 300 further includes a charging device 305 in communication with the ring or with a user device 106, as described with reference to FIG. 2. The ring 104 may be in wireless and/or wired communication with a user device 106 and/or server 110. Similarly, the charging device 305 may be in wireless and/or wired communication with a user device 106, the ring 104, a server 110, or any combination thereof. In some implementations, the charging device 305 may send measured and processed data (e.g., temperature data, humidity data, noise data, and the like) to the user device 106, the ring 104, or both. Various data processing procedures described herein may be performed by any of the components of system 300, including the ring 104, charging device 305, user device 106, server 110, or any combination thereof.

Data may be collected and analyzed via one or more components of the system 300. Moreover, in some implementations, the charging device 305 may be configured to collect and analyze data, including ambient temperature data, noise data, and the like. For example, the user device 106 may determine a correlation between sleep data from the ring 104 and the measured and processed data from the charging device 305 (e.g., if the air temperature is relatively high, a user of the ring 104 may wake up throughout a sleep duration). In other words, data collected via the charging device 305 (e.g., ambient air temperature data, noise data) may be used to further analyze physiological data collected via the ring 104.

The ring 104 may include an inner housing 205-*a* and an outer housing 205-*b*, as described with reference to FIG. 2. In some aspects, the housing 205 of the ring 104 may store or otherwise include various components of the ring 104 including, but not limited to, device electronics (e.g., a power module 310, which may be an example of a power module 225 as described with reference to FIG. 2), a power source (e.g., battery 315, which may be an example of a battery 210 as described with reference to FIG. 2, and/or capacitor), one or more substrates (e.g., printable circuit boards) that interconnect the device electronics and/or power source, and the like. In some examples, the housing 205 may also store a magnetic component 320-*a* (e.g., ferrite tape, other charging magnet, a transmitter coil, a rare earth magnet, or the like) and an inductive charging component 325 (e.g., inductive charging component 325-*a*).

The ring 104 shown and described with reference to FIGS. 2 and 3 is provided solely for illustrative purposes. As such, the ring 104 may include additional or alternative components as those illustrated in FIGS. 2 and 3. Other rings 104 that provide functionality described herein may be fabricated. For example, rings 104 with fewer components (e.g., sensors) may be fabricated. In a specific example, a ring 104 may include ferrite tape, which may act as both the magnetic component 320-*a* and the inductive charging component 325-*a*. In other cases, the ring 104 may include a dedicated charger magnet. For example, the ring 104 may include a metal plate and/or ferrite tape disposed proximate to a charger magnet.

In some examples, the ring 104 may be in electronic communication with the charging device 305. The charging device 305 may charge the battery 315 of the ring 104. The charging device 305 may include a support 330, which may store or otherwise include various components of the charging device 305. In some aspects, the support 330 of the charging device 305 may store or otherwise include various components of the charging device 305 including, but not limited to, a magnetic component 320-*b* (e.g., ferrite tape, a transmitter coil, a rare earth magnet, or the like), one or more physical support structures, a charging component 325-*b*, or any combination thereof.

In some cases, the magnetic component 320-*b* of the support 330 may include multiple magnets arranged according to a pattern based on a polarity of each magnet. For example, each magnet may have a polarity facing outward towards the surface of the charging device 305 to attract the magnetic component 320-*a* of the ring 104 with an opposite polarity. The charging component 325-*b* of the charging device 305 (e.g., transmitter coil, ferrite tape) may couple with charging component 325-*a* of the ring 104 (e.g., receiver coil, ferrite tape) to charge the battery 315 of the ring 104. In some examples, the charging component 325-*a* and the charging component 325-*b* may support charging of the battery 315 via direct electrical coupling (e.g., of contacts at the surface of the support 330 and the ring 104). Additionally, or alternatively, the charging component 325-*a* and the charging component 325-*b* may be examples of inductive charging components, which may support charging of the battery 315 via indirect electrical coupling. Inductive charging may also be referred to as wireless charging and may allow power to transfer from the charging device 305 to the battery 315 of the ring 104 using electromagnetic induction.

In some examples, the charging device 305 may include one or more temperature sensors 335. The temperature sensors 335 may measure an average air temperature over a duration, may continuously measure air temperature, or both. Similarly, the charging device 305 may include one or more humidity sensors 340. The humidity sensors 340 may measure an average humidity level over a duration, may continuously measure humidity level, or both. The humidity sensors 340 may measure the humidity as a percentage (e.g., 35% humidity). The charging device 305 may include one or more noise sensors 345. The noise sensors 345 may measure a noise level (e.g., in decibels) averaged over a duration, continuously, or both. The charging device 305 may store the humidity measurements, the temperature measurements, the noise measurements, or a combination thereof.

The charging device 305 may include any type of sensor known in the art and may be configured to collect any type of data which may be used to provide insight into a user's environment and overall health. For example, the charging device 305 may include light sensors configured to measure an amount of light and/or type of light (e.g., wavelength). In such cases, the system 300 may be configured to determine whether light levels and/or which types of light may result positively or negatively affect a user's sleep and health (e.g., determine if blue light is more disruptive to a user's sleep as compared to red light). By way of another example, the charger base may include air quality sensors configured to measure air quality, pollutants, allergens, and the like. Data collected via sensors of the charger base may be leveraged to determine how a user's surrounding environment may affect their physiological data, sleep, and overall health. A processing module, such as a processing module 230 as described with reference to FIG. 2, at the user device 106 or at the charging device 305 may process the data from the temperature sensors 335, the humidity sensors 340, the noise sensors 345, light sensors, air quality sensors, or a combination thereof.

In some examples, the user device 106 and/or charging device 305 may process the data from the temperature sensors 335, the humidity sensors 340, the noise sensors 345, or a combination thereof in conjunction with data from the ring 104. For example, the user device 106 may receive physiological data collected by the ring 104 which reflects one or more sleep cycles of a user and may use the data from the sensors at the charging device 305 to determine a correlation between the collected physiological data and data collected by the charging device 305. For example, the user device 106 may determine a correlation over a time interval between data collected by the charging device 305 (e.g., ambient temperature data, humidity data, noise data, and the like) with a quality of sleep for the user (as determined by collected physiological data). In other words, the system 300 may be configured to identify whether high/low temperature, humidity, and/or noise levels result in a disruption of the user's sleep cycles (e.g., low ambient temperature and humidity levels result in higher quality sleep, higher noise levels result in lower quality sleep).

Although the charging device 305 is illustrated as including temperature sensors 335, humidity sensors 340, and noise sensors 345, the charging device 305 may include any quantity and type of sensors in one or more locations. For example, the charger base may also include a motion sensor, a light sensor, or the like.

In some cases, the charging device 305 may include an LED system 350. The LED system 350 may display one or more indications to a user of the ring 104. For example, the LED system 350 may display a battery level of the battery 315, a battery health/charge status (e.g., end of battery life), a time of day, connectivity issues, one or more scores of the user (e.g., a sleep score related to how well a user slept, a readiness score or level, an activity level, or the like). Additionally, or alternatively, the LED system 350 may display one or more alerts to the user (e.g., action items prompting the user to perform an action, and the like). The LED system 350 may display a battery level of the battery 315 of the ring 104 as a percentage of total battery by displaying the numbers of the percentage, by illuminating a portion of LEDs (e.g., if a battery level is at 50%, 5 of 10 LEDs may be displayed), or the like. The LEDs in the LED system 350 may be oriented in any arrangement on the charging device 305, may be any color combination (e.g., red LED, blue LED, green LED), and there may be any quantity of LEDs in the LED system 350.

In some implementations, the charging device 305 may include a wired or wireless power source. For example, in some cases, the charging device 305 may be coupled with an electrical outlet or other power source. In other cases, the charging device 305 may include a battery or other internal power source to enable mobile charging of the ring 104. For example, in some implementations, the charging device 305 may include a battery or other internal power source such that a user may physically wear or carry the charger along with the ring 104 for mobile charging. For instance, the charging device 305 may be worn on a necklace so that a user may wear the charger while simultaneously charging the ring 104. In other cases, the charging device 305 may be coupled with the ring 104 (e.g., magnetically coupled, mechanically snapped onto) the ring 104 while the ring 104 is being worn so that the ring 104 may be charged (and continue to collect physiological data) as it is worn.

In some aspects, the system 300 may support techniques for a universal charger (e.g., charging device 305) that is able to accommodate and charge wearable ring devices 104 of varying sizes. The charging device 305 may include a configuration of three contact points to secure wearable ring devices 104 of varying size to the charging device 305. Specifically, the charging device 305 includes a charging post set in a ring-shaped well that is able to receive multiple different sized wearable ring devices 104. Two support structures may contact the outer circumferential surface of a wearable ring device 104 at different radial positions to force the wearable ring device 104 against the charging post for charging. In order to accommodate different sized wearable ring devices 104, the angle or curvature of the support structures may be offset relative to the angle (e.g., curvature) of the charging post. By offsetting the angle of the support structures, larger wearable ring devices 104 may contact the support structures toward the outer edges of the support structures, where smaller wearable ring devices 104 may contact the support structures toward the inner edges of the support structures. The charging device 305 is further described herein with reference to FIGS. 4-7.

Figure 4:
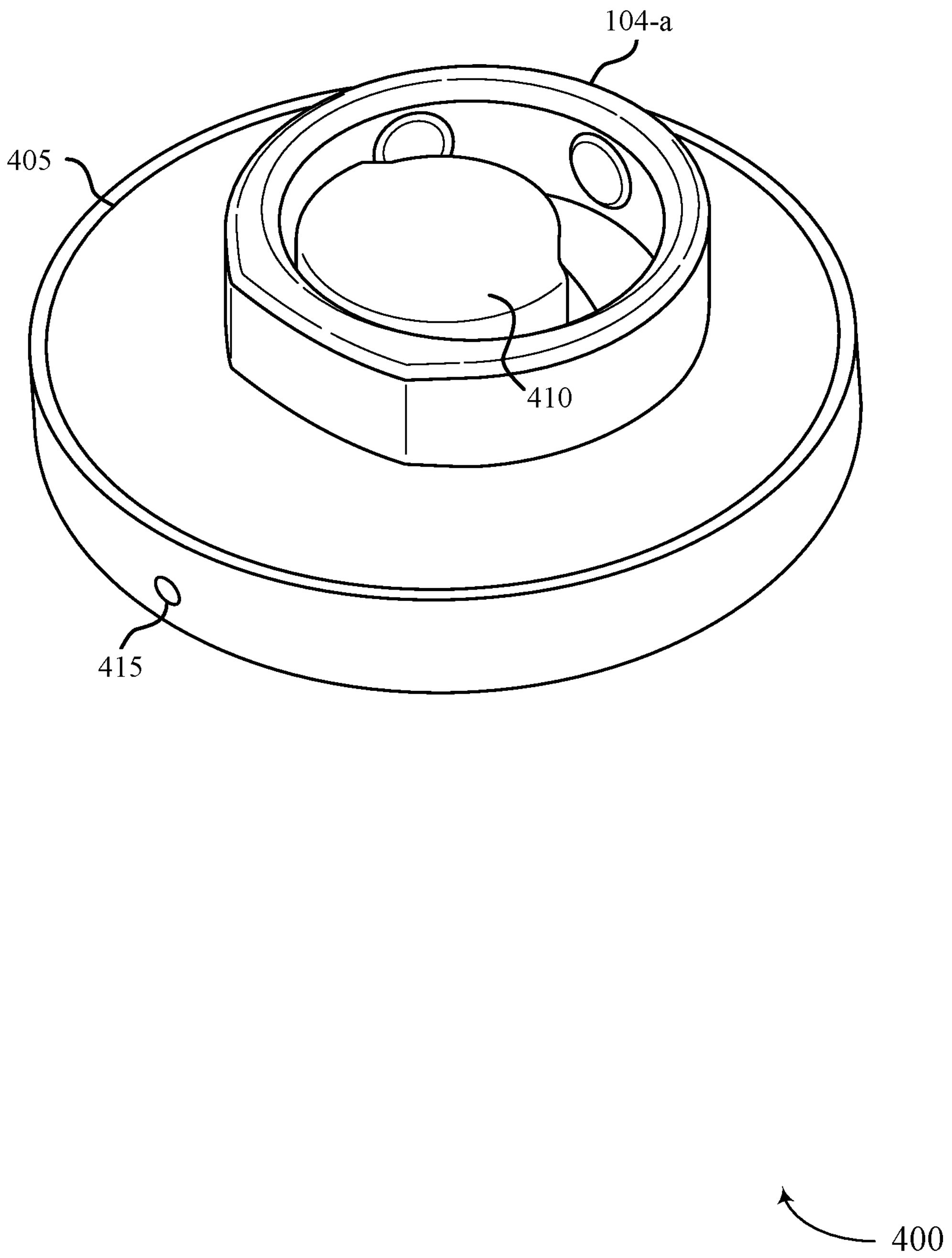
FIGS. 4 through 7 show example charging diagrams that support a universal charger in accordance with aspects of the present disclosure.

FIG. 4 shows an example of a charging diagram 400 that supports a universal charger in accordance with aspects of the present disclosure. The charging diagram 400 illustrates an example of a wearable device 104-*a* (e.g., a ring, a bracelet, or another device) and a charging device 405, as described herein with reference to FIGS. 1 through 3.

In some examples, the charging device 405 may include a charging post 410 (also referred to herein as a post or mounting portion), and the wearable device 104-*a* may be configured to charge when positioned against the charging post 410 of the charging device 405. For example, the charging post 410 may include one or more charging components (e.g., inductive charging components), and the wearable device 104-*a* may have one or more charging components (e.g., inductive or contact-based charging components), such that the wearable device 104-*a* is configured to charge when the charging components of the wearable device 104-*a* are within a threshold distance or are in physical contact with one of the charging components of the charging device 405 (e.g., within the charging post 410).

In some cases, the charging device 405 may include an indicator 415 (e.g., an LED or similar light emitting component). The indicator 415 may display one or more indications associated with the wearable device 104-*a*. For example, the indicator 415 may display a battery level of a battery of the wearable device 104-*a*, a battery health/charge status (e.g., end of battery life), a time of day, connectivity issues, one or more scores of the user (e.g., a sleep score related to how well a user slept, a readiness score or level, an activity level, or the like). Additionally, or alternatively, the indicator 415 may display one or more alerts to the user (e.g., action items prompting the user to perform an action, and the like). The indicator 415 may be any color combination (e.g., red LED, blue LED, green LED), and there may include any quantity of LEDs.

In some cases, the wearable device 104-*a* may be associated with a charging device 405 manufactured for the size of the wearable device 104-*a*, such that the size of the charging device 405 (e.g., a size of the charging post 410 of the charger base) may be specific to the size of the wearable device 104-*a*. For example, the outer diameter of the charging post 410 may be manufactured to generally correspond to the inner circumference of a particular sized wearable device 104-*a*. However, manufacturing multiple chargers (e.g., one for each size ring, or one charger for a small range of sizes) may be expensive and/or result in other technical and manufacturing challenges. Moreover, if the charging device 405 is built to accommodate multiple sizes of wearable devices 104, the differently sized wearable devices 104 may exhibit poor charging due to a loose fit of the wearable devices 104 around the charging post 410. For instance, the charging components of the wearable device 104-*a* may be located further than the threshold distance from the charging components of the charging post 410, which may result in the wearable device 104-*a* failing to charge or charging at a relatively slow speed.

Accordingly, aspects of the present disclosure are directed to a "universal charger" design for charging devices that are able to accommodate and charge wearable ring devices 104-*a* of varying sizes. In accordance with aspects of the present disclosure, the charging device 405 may include a configuration of three contact points to secure wearable ring devices 104 of varying size to the charging device 405. Specifically, the charging post 410 may be set in a ring-shaped well that is able to receive multiple different sized wearable ring devices 104. The charging device 405 may include a support apparatus including one or more support structures that contact the outer circumferential surface of the wearable ring device 104-*a* at different radial positions to force the wearable ring device 104-*a* against charging post 410 for charging. The distance between the support structures and the charging post 410 may correspond to a width of the varying sized wearable ring devices 104.

In order to accommodate different sized wearable ring devices 104, the angle or curvature of the support structures 520 may be offset relative to the angle (e.g., curvature) of the charging post 410. By offsetting the angle of the support structures, larger wearable ring devices 104 may contact the support structures toward the outer edges of the support structures, where smaller wearable ring devices 104 may contact the support structures toward the inner edges of the support structures. Further, the support structures may be configured to contact the wearable ring device 104 placed on an upper hemisphere of the wearable ring device 104 (e.g., higher than halfway up on the ring) when the wearable ring device 104 is placed on the charging device 405. By contacting the wearable ring device 104 on the upper hemisphere, the charging device 405 described herein may be able to securely retain the wearable ring device 104 against the charging device 405 when the entire charging device 405 is moved or otherwise disturbed. The universal charging device of the present disclosure is further described herein with reference to FIGS. 4-7.

Figure 5:
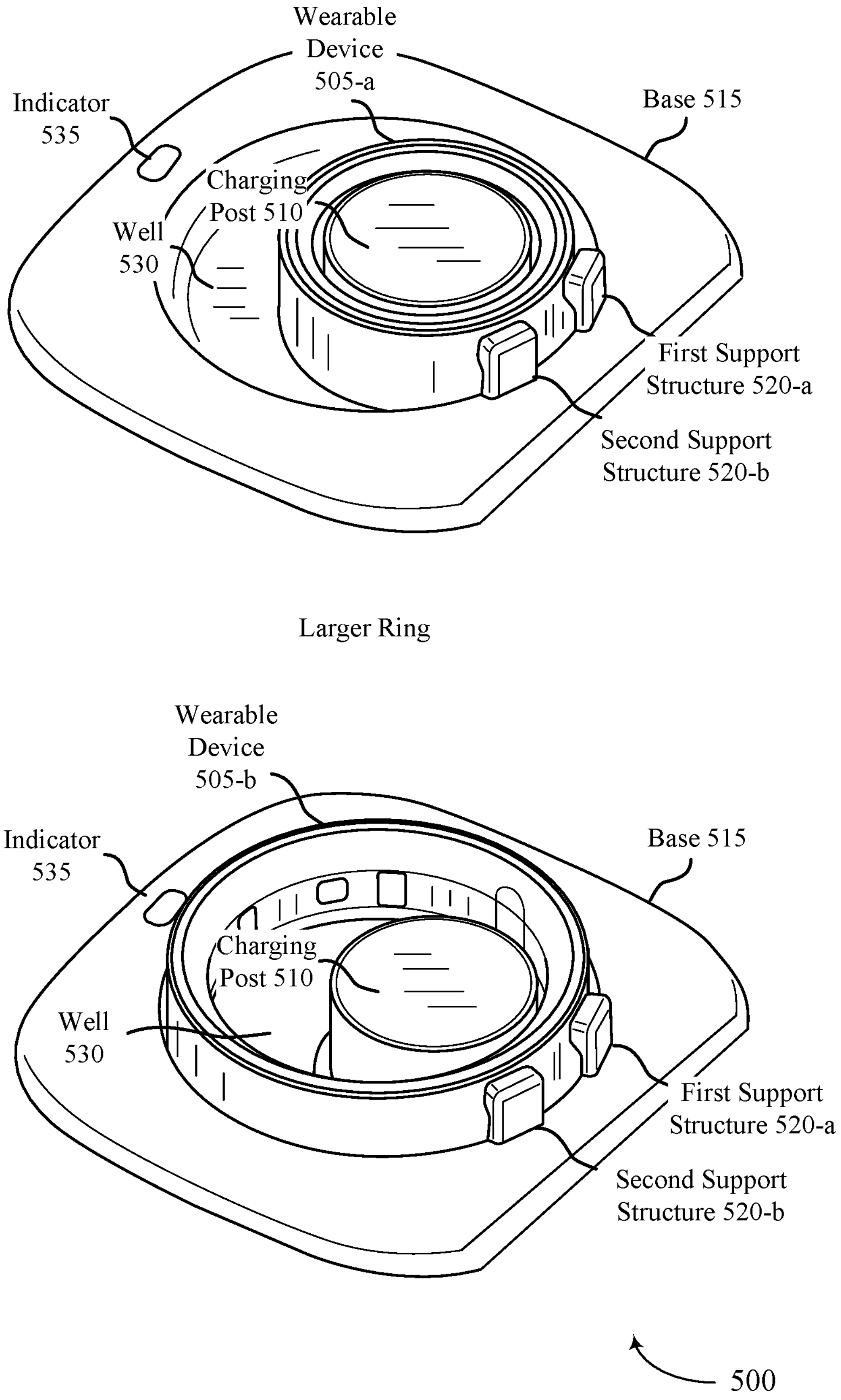

FIG. 5 shows an example of a charging diagram 500 that supports a universal charger in accordance with aspects of the present disclosure. The charging diagram 500 illustrates a universal charger for multiple sizes of wearable ring device 505. In particular, the top portion of the charging diagram 500 in FIG. 5 illustrates the charging device being used to charge a smaller wearable ring device 505-*a*, whereas the bottom portion of the charging diagram illustrates the charging device being used to charge a larger wearable ring device 505-*b*.

The universal charger may include a charger base 515, a charging post 510, a first support structure 520-*a*, a second support structure 520-*b*, a well 530, and an indicator 535 The charging diagram 500 may implement, or be implemented by, the systems shown in FIGS. 1-4. In this regard, the wearable device 505-*a* (e.g., smaller wearable ring device) and the wearable device 505-*b* (e.g., larger wearable ring device) may be examples of wearable devices 104 described herein (e.g., a ring, a bracelet, or another device).

As shown in FIG. 5, the same charging device may be configured to receive and charge wearable ring devices 505 of varying sizes. That is, the charging device illustrated in FIG. 5 may be configured to accommodate a range of ring sizes. In some cases, the charging post 510 may exhibit a diameter or circumference that corresponds to an inner diameter or circumference of the smallest compatible ring size. For example, the first wearable device 505-*a* illustrated in the top portion of FIG. 5 may exhibit an inner diameter or circumference that conforms to an outer diameter/circumference of the charging post 510 such that the first wearable device 505-*a* exhibits the smallest ring size that is compatible with the charging device. Comparatively, the inner diameter/circumference of the second wearable device 505-*b* may be larger than the outer diameter/circumference of the charging post 510.

In this regard, the inner circumferential surface of the smaller wearable device 505-*a* may contact the surface of the charging post 510 around the circumference of the charging post 510. Comparatively, the inner circumferential surface of the larger wearable device 505-*b* may contact the surface of the charging post 510 facing the support structures 520, but may be offset relative to the second surface of the charging post 510 opposite the support structures 520. In some examples, the surface of the post 510 may conform to a profile of the inner circumferential surface of the respective wearable devices 505.

In some aspects, the charging post 510 may include an inductive charging component. The inductive charging component may be configured to wirelessly charge the wearable device 505 through a surface of the charging post 510 via inductive coupling when an inner circumferential surface of the respective wearable device 505 is within a threshold distance of the surface of the charging post 510. The threshold distance may be based on one or more parameters associated with the inductive charging component of the charging device. The inductive charging components may include a transmitter coil, ferrite tape, or both.

In some aspects, the well 530 disposed within the base may help hold wearable devices 505 in place for charging. The well 530 may be an indent for the wearable device 505, such that the wearable device is indented into the base 515 when charging. In some cases, the well 530 may be ring-shaped and may surround the charging post 510. In some cases, the center of the charging post 510 may be offset relative to the center of the well 530. For example, as shown in FIG. 5, the charging post 510 may be shifted to the right (e.g., toward the support structures 520) relative to the center of the well 530, as will be described in further detail herein. In some cases, the well 530 may exhibit a diameter or circumference that corresponds to an outer diameter or circumference of the largest compatible ring size. For example, the second wearable device 505-*b* illustrated in the bottom portion of FIG. 5 may exhibit an outer diameter or circumference that conforms to an outer diameter/circumference of the well. Comparatively, the outer diameter/circumference of the first wearable device 505-*a* may be smaller than the outer diameter/circumference of the well 530, as shown in the top portion of FIG. 5.

The indicator 535 may indicate a charging status, charging efficacy, and the like, as described previously herein. In some examples, the indicator 535 may be a light. For example, the indicator 535 may indicate that the wearable device 505 is not charged by changing color, such as to red. Other indications may be shown by blinking, different colors, etc.

The charging device may include a support apparatus that includes one or more support structures 520 that are configured to contact the wearable ring device 505 at two or more radial positions along the outer circumferential surface of the wearable device 505. For example, as shown in FIG. 5, the support apparatus may include a first support structure 520-*a* and a second support structure 520-*b* that are configured to contact the wearable device 505 at different respective radial positions along the outer circumferential surface of the wearable device 505 to secure or maintain the respective wearable device 505 against the charging post 510 for charging. In additional or alternative implementations, the support apparatus may include a single support structure 520 that contacts the wearable ring device 104 at different radial positions (e.g., a "pronged" or bifurcated support structure 520).

The first support structure 520-*a* and the second support structure 520-*b* may be clips, springs, or other structures that are configured to hold the wearable device 505 against the charging post 510. In particular, the charging device may be configured to contact wearable devices 505 of varying size at three different locations to secure the respective wearable device 505 against the charging device for charging: (1) a first location at the first support structure 520-*a*, (2) a second location at the second support structure 520-*b*, and (3) at least a third location at the charging post 510.

The one or more support structures 520 of the support apparatus may be configured to secure the wearable device 505 against the charging post 510 for charging. For example, the first support structure 520-*a* may be configured to contact the respective wearable device 505 at a first radial position along an outer circumferential surface of the wearable device 505, and the second support structure 520-*b* may be configured to contact the respective wearable device 505 at a second radial position along the outer circumferential surface of the wearable device 505.

In some aspects, the distance between the charging post 510 and the first support structure 520, and the distance between the charging post 510 and the second support structure 520-*b*, may be based on the width of the compatible wearable devices 505. In particular, the charging device may be compatible with a range of ring sizes, where each ring within the range of compatible ring sizes may exhibit a same (or approximately the same) width. For example, in some cases, the first wearable device 505-*a* and the second wearable device 505-*b* may have approximately the same width. In such cases, the distance between the charging post 510 and the support structures 520 may be based on (e.g., correspond to, approximately equal to) the width of the wearable devices 505.

In some cases, such as in cases where wearable devices 505 of varying size have different widths, the support structures 520 may be movable with respect to the charging post 510 so that the charging device can accommodate wearable devices 505 of varying size/width. For example, in some cases, the support structures 520 may be able to slide closer and further from the charging post 510.

The first support structure 520-*a* and the second support structure 520-*b* may be configured to contact the outer circumferential surface of the respective wearable device 505 along an upper hemisphere that is above a centerline of the wearable device 505. The first support structure 520-*a* and the second support structure 520-*b* may collectively exert a force on the wearable device 505 toward the charging post 510. Conversely, the surface of the charging post 510 may exert a force on the wearable device 505 away from the charging post 510.

Comparatively, the surface of the charging post 510 may be configured to contact the inner circumferential surface of the respective wearable device 505 along a lower hemisphere that is below the centerline of the respective wearable device 505. In some cases, the forces exerted by the charging post 510 and the support structures 520 may be parallel to one another, and approximately equal in magnitude. The forces exerted by the charging post 510 and the support structures 520 will be further shown and described with respect to FIG. 7. In some cases, the forces exerted by the charging post 510 and the support structures 520 may be configured to retain the wearable device 505 in a charging position on the charging device when the charging device is flipped vertically, upside down, or both.

The shape and orientation of the first support structure 520-*a* and the second support structure 520-*b* may be configured to accommodate wearable devices 505 of varying size. In particular, the angle or curvature of the first support structure 520-*a* and the second support structure 520-*b* may be offset from the angle/curvature of the charging post 510. For example, the first support structure 520-*a* may be at an angle, or curvature, that is offset relative to an angle, or curvature, of the surface of the charging post 510. Similarly, the second support structure 520-*b* may be at an angle, or curvature, that is offset relative to an angle, or curvature, of the surface of the charging post 510. The second support structure 520-*b* may have an angle/curvature that is the same or different from the first support structure 520-*a*.

In some aspects, the relative angles/curvatures of the support structures 520 relative to the charging post 510 may enable the support structures 520 to accommodate and contact wearable devices 505 of varying size. In particular, the angle/curvature of the support structures 520 may cause different sizes of the wearable device 505 to contact the support structures 520 in different locations. For example, the smaller wearable device 505-*a* may contact the support structures 520 toward the inside of the support structures 520, and the larger wearable device 505-*b* may contact the support structures 520 toward the outside of the support structures 520. This concept will be further shown and described with reference to FIG. 6.

The first support structure 520-*a*, the second support structure 520-*b*, or both, may be able to move relative to the base 515 and the charging post 510, such that the support structure(s) 520 may be displaced from a first position to a second position when the wearable device 505 is placed onto the charging device for charging. For example, the support structure(s) 520 may bend away from the charging post 510 as the wearable device 505 is placed around the charging post 510, and then may "snap" back to an original position (e.g., closer to the charging post 510) when the wearable device 505 is placed into the charging position. When the wearable device 505 is placed for charging, the wearable device 505 may completely surround the charging post 510.

Figure 6:
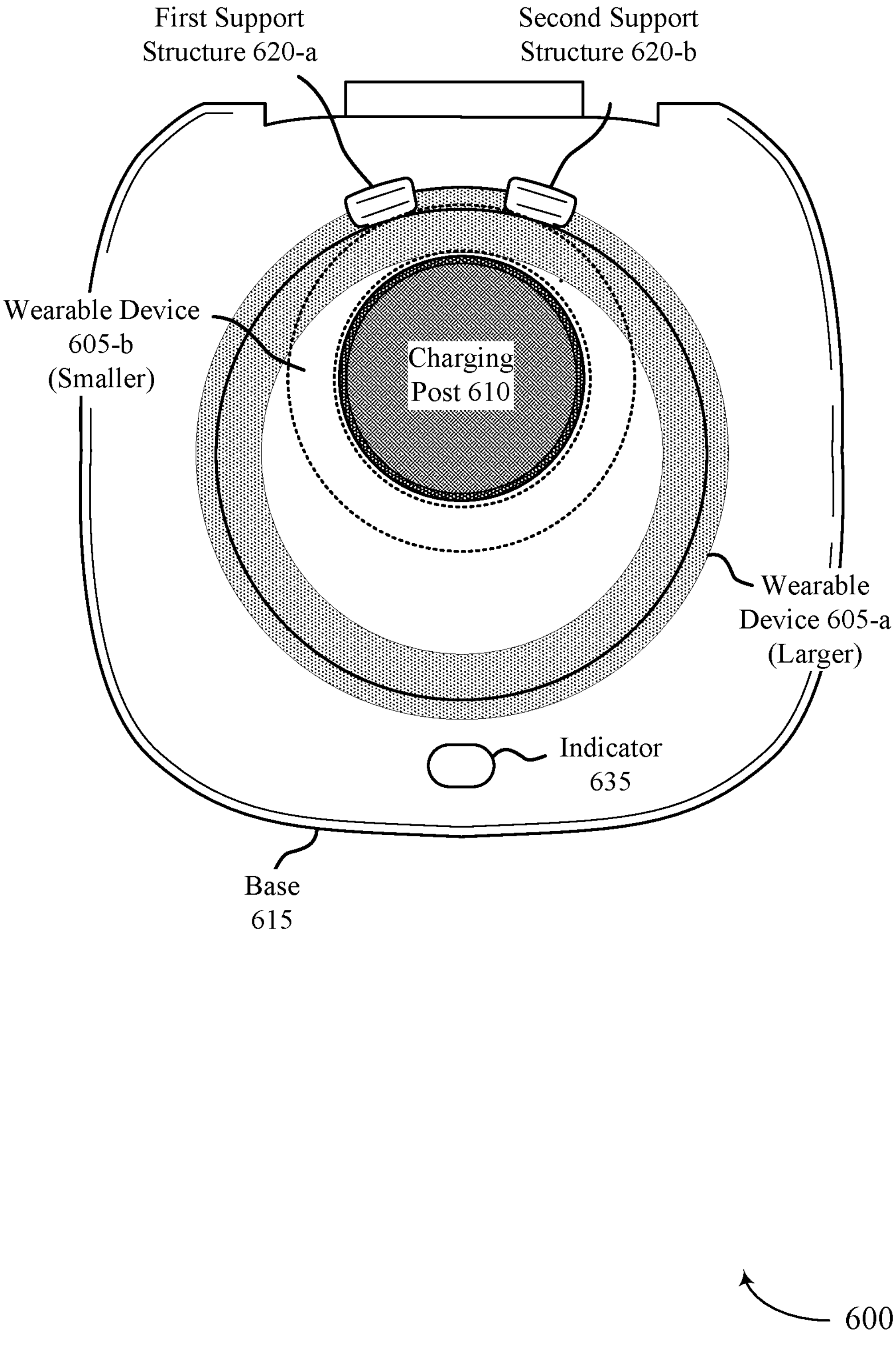

FIG. 6 shows an example of a charging diagram 600 that supports a universal charger in accordance with aspects of the present disclosure. The charging diagram 600 illustrates a top view of the universal charger shown and described in FIG. 5. In this regard, the charging diagram 600 illustrated in FIG. 6 may implement, or be implemented by, the systems and charging diagrams illustrated in FIGS. 1-5. In this regard, the respective components/features of the charging device illustrated in FIG. 6 may be examples of the components/features of the charging device illustrated in FIG. 5.

The charging device may include a base 615, a charging post 610, a first support structure 620-*a*, a second support structure 620-*b*, a well 630, and an indicator 635. The charging post 610 may extend from the base 615, and be configured to receive multiple sizes of wearable device 605. The charging post 610 may include an inductive charging component configured to wirelessly charge the wearable device 605 through the surface of the charging post 610 via inductive coupling. The first support structure 620-*a* and the second support structure 620-*b* may be support apparatus and structures that secure the wearable device 605 against the charging post 610 for charging.

As described previously herein, the shape and orientation of the first support structure 620-*a* and the second support structure 620-*b* may be configured to accommodate wearable devices 605 of varying size. In particular, the angle or curvature of the first support structure 620-*a* and the second support structure 620-*b* may be offset from the angle/curvature of the charging post 610. That is, an angle of a surface of the first support structure 620-*a* that faces the charging post 610 may be offset relative to an angle of a surface of the charging post 610 that faces the first support structure 620-*a*. Similarly, an angle of a surface of the second support structure 620-*b* that faces the charging post 610 may be offset relative to an angle of a surface of the charging post 610 that faces the second support structure 620-*b*.

In some aspects, the relative angles/curvatures of the support structures 620 relative to the charging post 610 may enable the support structures 620 to accommodate and contact wearable devices 605 of varying size. In particular, the angle/curvature of the support structures 620 may cause different sizes of the wearable device 605 to contact the support structures 620 in different locations.

For example, as shown in FIG. 6, a larger wearable device 605-*a* may contact the support structures 620 toward the outer ends of the respective supports structures 620 (e.g., toward the left end of the first support structure 620-*a*, and toward the right end of the second support structure 620-*b*). Comparatively, a smaller wearable device 605-*b* may contact the support structures 620 toward the inner ends of the respective support structures 620 (e.g., toward the right end of the first support structure 620-*a*, and toward the left end of the second support structure 620-*b*). In this regard, offsetting the angles/curvatures of the support structures 620 relative to the angle/curvature of the charging post 610 may enable the support structures 620 to contact wearable devices 605 of varying size, and thereby maintain wearable devices 605 of varying size against the charging post 610 for charging.

Figure 7:
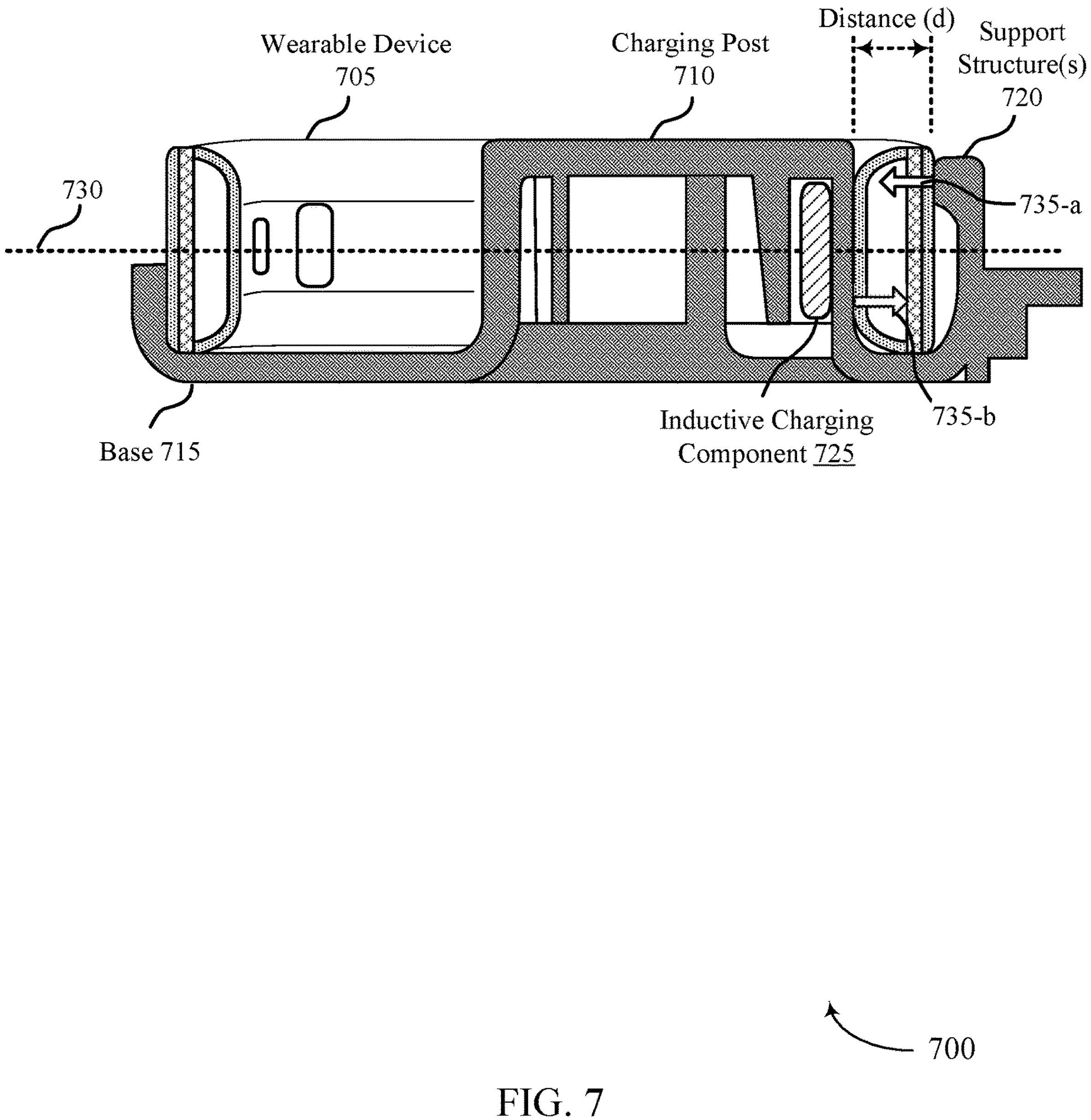

FIG. 7 shows an example of a charging diagram 700 that supports a universal charger in accordance with aspects of the present disclosure. The charging diagram 700 illustrates a side cross-sectional view of the universal charge described in FIGS. 5-6. In this regard, the charging diagram 700 illustrated in FIG. 7 may implement, or be implemented by, the systems and charging diagrams shown and described in FIGS. 1-6.

As described previously herein, the charging device may include a base 715, a charging post 710, and support structures 720. The charging device may be configured to accommodate and charge wearable devices 705 of varying sizes. In some cases, the charging post 710 may exhibit a diameter or circumference that corresponds to an inner diameter or circumference of the smallest compatible ring size. In this regard, the inner circumferential surface of smaller wearable devices 705 may contact the surface of the charging post 710 around the circumference of the charging post 710. Comparatively, the inner circumferential surface of larger wearable devices 705 (such as the wearable device 705 illustrated in FIG. 7) may contact the surface of the charging post 710 facing the support structures 720, but may be offset relative to the second surface of the charging post 710 opposite the support structures 720. In some examples, the surface of the charging post 710 may conform to a profile of the inner circumferential surface of the respective wearable devices 705.

In some aspects, the distance (d) between the charging post 710 and the support structures 720 may be based on the width of the compatible wearable devices 705. For example, as shown in FIG. 7, the support structures 720 may be placed a distance (d) away from the charging post 710 that corresponds to (e.g., is equal to) a width of the compatible wearable devices 705. In additional or alternative implementations, such as in cases where wearable devices 705 of varying size have different widths, the support structures 720 may be movable with respect to the charging post 710 so that the charging device can accommodate wearable devices 705 of varying size/width. For example, in some cases, the support structures 720 may be able to slide closer and further from the charging post 710.

In some aspects, the charging post 710 may include an inductive charging component 725 that is configured to wirelessly interface with (e.g., wirelessly charge) the wearable device 705 through a surface of the charging post 710 via inductive coupling when an inner circumferential surface of the respective wearable device 705 is within a threshold distance of the surface of the charging post 710. The threshold distance may be based on one or more parameters associated with the inductive charging component 725 of the charging device. The inductive charging component 725 may include a transmitter coil, ferrite tape, or both.

In some aspects, the support structures 720 may be configured to contact the outer circumferential surface of the wearable device 705 on an upper hemisphere of the wearable device 705 that is above a centerline 730 of the wearable device 705. Comparatively, the surface of the charging post 710 may contact the inner circumferential surface of the wearable device 705 on a lower hemisphere of the wearable device 705 that is below the centerline 730 of the wearable device 705.

In some aspects, the support structures 720 (e.g., first support structure 720, second support structure 720) may collectively exert a first force 735-*a* on the wearable device 705 toward the charging post 710, and the surface of the charging post 710 may exerts an second force 735-*b* on the wearable device 705 away from the charging post 710. In some cases, the first force 735-*a* and the second force 735-*b* may be parallel to one another and/or equal in magnitude (but in opposite directions). As shown in FIG. 7, due to the locations that the support structures 720 and the charging post 710 contact the wearable device 705 along the upper/lower hemispheres of the wearable device 705, the first force 735-*a* exerted by the support structures 720 may be offset towards the upper hemisphere of the wearable device 705 (e.g., above the centerline 730), and the second force 735-*b* exerted by the charging post 710 may be is offset towards the lower hemisphere of the wearable device 705 (e.g., below the centerline 730).

The forces 735-*a*, 735-*b* exerted by the support structures 720 and the charging post 710 have been found to retain the wearable device 705 in a charging position on the charging device when the charging device is flipped vertically, upside down, or both. In particular, is has been found that offsetting the forces 735-*a* and 735-*b* above and below the centerline 730 of the wearable device 705, respectively, help secure the wearable device 705 on/within the charging device even in cases where the charging device is moved, flipped upside down, and the like.

It should be noted that the methods described above describe possible implementations, and that the operations and the steps may be rearranged or otherwise modified and that other implementations are possible. Furthermore, aspects from two or more of the methods may be combined.

An apparatus device is described. The apparatus may include a base, a charging post extending from the base, the charging post configured to receive rings associated with a plurality of ring sizes, wherein the charging post comprises a diameter that corresponds to an inner diameter of a smallest ring size of the plurality of ring sizes, an inductive charging component disposed within the charging post, the inductive charging component configured to wirelessly charge a wearable ring device through a surface of the charging post via inductive coupling when an inner circumferential surface of the wearable ring device is within a threshold distance of the surface of the charging post, and a support apparatus configured to secure a wearable ring device associated with a ring size of the plurality of ring sizes against the charging post for charging, wherein the support apparatus comprises a first support structure configured to contact the wearable ring device at a first radial position along an outer circumferential surface of the wearable ring device and a second support structure configured to contact the wearable ring device at a second radial position along the outer circumferential surface of the wearable ring device, wherein a first distance between the charging post and the first support structure and a second distance between the charging post and the second support structure are each based at least in part on a width of the plurality of ring sizes.

In some examples of the apparatus, the first support structure and the second support structure may be configured to contact the outer circumferential surface of the wearable ring device along an upper hemisphere that may be above a centerline of the wearable ring device.

In some examples of the apparatus, the surface of the charging post may be configured to contact the inner circumferential surface of the wearable ring device along a lower hemisphere that may be below the centerline of the wearable ring device.

In some examples of the apparatus, the first support structure and the second support structure collectively exert a first force on the wearable ring device toward the charging post, the surface of the charging post exerts a second force on the wearable ring device away from the charging post, and the first force and the second force may be parallel to one another.

In some examples of the apparatus, the first force may be offset towards the upper hemisphere of the wearable ring device and the second force may be offset towards the lower hemisphere of the wearable ring device.

In some examples of the apparatus, the first force and the second force may be configured to retain the wearable ring device in a charging position on the charging device when the charging device may be flipped vertically, upside down, or both.

In some examples of the apparatus, the first support structure may be associated with a first angle or curvature that may be offset relative to an angle or curvature of the surface of the charging post, the second support structure may be associated with a second angle or curvature that may be offset relative to the angle or curvature of the surface of the charging post, and the first angle or curvature of the first support structure may be different from the second angle or curvature of the second support structure.

In some examples of the apparatus, wherein the first angle or curvature of the first support structure and the second angle or curvature of the second support structure causes the wearable ring device to contact the first and second support structures toward a first end of the first and second support structures when the wearable ring device comprises a first ring size of the plurality of ring sizes and wherein the first angle or curvature of the first support structure and the second angle or curvature of the second support structure causes the wearable ring device to contact the first and second support structures toward a second end of the first and second support structures opposite the first end when the wearable ring device comprises a second ring size of the plurality of ring sizes that may be different from the first ring size.

In some examples of the apparatus, the first support structure and the second support structure may be movable relative to the base and the charging post.

In some examples of the apparatus, the first support structure and the second support structure may be configured to be displaced from a first position to a second position when the wearable ring device may be placed onto the charging device for charging.

In some examples of the apparatus, the wearable ring device completely surrounds the charging post when the wearable ring device may be placed onto the charging device for charging.

In some examples of the apparatus, wherein the inner circumferential surface of the wearable ring device contacts the surface of the charging post and a second surface of the charging post opposite the surface when the wearable ring device may be associated with the smallest ring size of the plurality of ring sizes and wherein the inner circumferential surface of the wearable ring device contacts the surface of the charging post and may be offset relative to the second surface of the charging post when the wearable ring device may be associated with a ring size of the plurality of ring sizes that may be larger than the smallest ring size.

In some examples of the apparatus, the surface of the charging post conforms to a profile of the inner circumferential surface of the wearable ring device.

In some examples of the apparatus, the base comprises a ring-shaped well surrounding the charging post.

In some examples of the apparatus, the ring-shaped well comprises a second diameter that corresponds to an outer diameter of a largest ring size of the plurality of ring sizes.

In some examples of the apparatus, a center of the charging post may be offset relative to a center of the ring-shaped well.

In some examples of the apparatus, the inductive charging component comprises a transmitter coil, ferrite tape, or both.

In some examples of the apparatus, the threshold distance may be based at least in part on one or more parameters associated with the inductive charging component of the charging device.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A charging device, comprising:

a base;

a charging post extending from the base, the charging post configured to receive rings associated with a plurality of ring sizes, wherein the charging post comprises a diameter that corresponds to an inner diameter of a smallest ring size of the plurality of ring sizes;

an inductive charging component disposed within the charging post, the inductive charging component configured to wirelessly charge a wearable ring device through a surface of the charging post via inductive coupling when an inner circumferential surface of the wearable ring device is within a threshold distance of the surface of the charging post; and a support apparatus configured to secure a wearable ring device associated with a ring size of the plurality of ring sizes against the charging post for charging, wherein the support apparatus comprises:

one or more support structures configured to contact the wearable ring device at a first radial position and a second radial position along an outer circumferential surface of the wearable ring device, wherein a distance between the charging post and the one or more support structures is based at least in part on a width of the plurality of ring sizes.

2. The charging device of claim 1, wherein the one or more support structures are configured to contact the outer circumferential surface of the wearable ring device along an upper hemisphere that is above a centerline of the wearable ring device.

3. The charging device of claim 2, wherein the surface of the charging post is configured to contact the inner circumferential surface of the wearable ring device along a lower hemisphere that is below the centerline of the wearable ring device.

4. The charging device of claim 3, wherein the one or more support structures collectively exert a first force on the wearable ring device toward the charging post, and wherein the surface of the charging post exerts a second force on the wearable ring device away from the charging post, wherein the first force and the second force are parallel to one another.

5. The charging device of claim 4, wherein the first force is offset towards the upper hemisphere of the wearable ring device, and wherein the second force is offset towards the lower hemisphere of the wearable ring device.

6. The charging device of claim 4, wherein the first force and the second force are configured to retain the wearable ring device in a charging position on the charging device when the charging device is flipped vertically, upside down, or both.

7. The charging device of claim 1, wherein the one or more support structures comprise a first support structure and a second support structure, wherein the first support structure is associated with a first angle or curvature that is offset relative to an angle or curvature of the surface of the charging post, and wherein the second support structure is associated with a second angle or curvature that is offset relative to the angle or curvature of the surface of the charging post, wherein the first angle or curvature of the first support structure is different from the second angle or curvature of the second support structure.

8. The charging device of claim 7, wherein the first angle or curvature of the first support structure and the second angle or curvature of the second support structure causes the wearable ring device to contact the first and second support structures toward a first end of the first and second support structures when the wearable ring device comprises a first ring size of the plurality of ring sizes, and wherein the first angle or curvature of the first support structure and the second angle or curvature of the second support structure causes the wearable ring device to contact the first and second support structures toward a second end of the first and second support structures opposite the first end when the wearable ring device comprises a second ring size of the plurality of ring sizes that is different from the first ring size.

9. The charging device of claim 1, wherein the one or more support structures are movable relative to the base and the charging post.

10. The charging device of claim 1, wherein the one or more support structures are configured to be displaced from a first position to a second position when the wearable ring device is placed onto the charging device for charging.

11. The charging device of claim 1, wherein the wearable ring device completely surrounds the charging post when the wearable ring device is placed onto the charging device for charging.

12. The charging device of claim 1, wherein the inner circumferential surface of the wearable ring device contacts the surface of the charging post and a second surface of the charging post opposite the surface when the wearable ring device is associated with the smallest ring size of the plurality of ring sizes, and wherein the inner circumferential surface of the wearable ring device contacts the surface of the charging post and is offset relative to the second surface of the charging post when the wearable ring device is associated with a ring size of the plurality of ring sizes that is larger than the smallest ring size.

13. The charging device of claim 1, wherein the surface of the charging post conforms to a profile of the inner circumferential surface of the wearable ring device.

14. The charging device of claim 1, wherein the base comprises a ring-shaped well surrounding the charging post.

15. The charging device of claim 14, wherein the ring-shaped well comprises a second diameter that corresponds to an outer diameter of a largest ring size of the plurality of ring sizes.

16. The charging device of claim 14, wherein a center of the charging post is offset relative to a center of the ring-shaped well.

17. The charging device of claim 1, wherein the inductive charging component comprises a transmitter coil, ferrite tape, or both.

18. The charging device of claim 1, wherein the threshold distance is based at least in part on one or more parameters associated with the inductive charging component of the charging device.

* * * * *